(12) United States Patent
Yang et al.

(10) Patent No.: US 9,955,158 B2
(45) Date of Patent: Apr. 24, 2018

(54) VIDEO ENCODER WITH ADJUSTABLE INTRA-REFRESH RATE

(71) Applicant: FREESCALE SEMICONDUCTOR, INC., Austin, TX (US)

(72) Inventors: Hongzhang Yang, Shanghai (CN); Zening Wang, Nanjing (CN); Peng Zhou, Shanghai (CN)

(73) Assignee: NXP USA, INC., Austin, TX (US)

( * ) Notice: Subject to any disclaimer, the term of this patent is extended or adjusted under 35 U.S.C. 154(b) by 158 days.

(21) Appl. No.: 15/230,457

(22) Filed: Aug. 7, 2016

(65) Prior Publication Data
US 2017/0064300 A1  Mar. 2, 2017

(30) Foreign Application Priority Data

Sep. 1, 2015 (CN) .......................... 2015 1 0659195

(51) Int. Cl.
*H04N 7/12* (2006.01)
*G06K 9/00* (2006.01)
*H04N 19/107* (2014.01)
*H04N 19/172* (2014.01)
*H04N 19/176* (2014.01)

(52) U.S. Cl.
CPC ......... *H04N 19/107* (2014.11); *H04N 19/172* (2014.11); *H04N 19/176* (2014.11)

(58) Field of Classification Search
CPC .. H04N 19/107; H04N 19/176; H04N 19/172; H04L 43/16
See application file for complete search history.

(56) References Cited

U.S. PATENT DOCUMENTS

| 6,842,484 | B2 | 1/2005 | Gandhi |
| 7,974,479 | B2 | 7/2011 | Tsukuda |
| 8,948,266 | B2* | 2/2015 | Liang .................... H04N 19/176 375/240.24 |
| 9,025,672 | B2* | 5/2015 | Duenas ................ H04N 19/176 375/240.24 |
| 9,113,169 | B2* | 8/2015 | Tsai ...................... H04N 19/176 |
| 9,479,800 | B2* | 10/2016 | NepomucenoLeung .................. H04N 19/107 |
| 2006/0078051 | A1 | 4/2006 | Liang et al. |
| 2014/0301460 | A1 | 10/2014 | Karczewicz et al. |
| 2016/0088299 | A1* | 3/2016 | Lee ....................... H04N 19/172 382/251 |
| 2017/0318308 | A1* | 11/2017 | Lu .......................... H04N 19/14 |

\* cited by examiner

*Primary Examiner* — Tsion B Owens
(74) *Attorney, Agent, or Firm* — Charles E. Bergere

(57) ABSTRACT

An encoding system for converting video data to a media stream based on a given intra-refresh rate includes an encoder for encoding the video data to frames based on the given intra-refresh rate, a decoder for reconstructing the encoded frames, and an evaluation unit for scoring macro blocks (MBs) of a current frame being decoded. A score of an intra-MB is defined as a predetermined value, and a score of an inter-MB is generated based on the scores of MBs of previous frames. A controller determines an actual refresh period based on a qualified frame identified based on the scores of the MBs of at least the current frame, and adjusts the given intra-refresh rate based on the actual refresh period.

20 Claims, 7 Drawing Sheets

VIDEO ENCODER WITH ADJUSTABLE INTRA-REFRESH RATE

BACKGROUND

The present invention relates generally to video encoding systems, and, more particularly, to a video encoding system for encoding video data to a media stream and adaptively adjusting an intra-refresh rate.

In video applications that favor uniform (even) channel bandwidth utilization, intra-refresh encoding is more preferable than periodic key frame encoding. However, it is difficult to achieve random access of an intra-refresh encoded bit stream due to a lack of key frames. FIG. 1 shows a conventional media stream 100 including a plurality of frames 102 encoded using an intra-refresh scheme, where a certain frame 102a being decoded, indicated by a given random access point, requires information in already decoded reference frames 102b. As shown in FIG. 2, which illustrates the frame 102 in the media stream 100 that is formed with a plurality of macro blocks (MBs) 104, the MBs 104 include intra-MBs 106 that are decoded using information in the current frame, and inter-MBs 108 that are decoded using information in previously decoded reference frames. The video source is encoded to the plurality of frames based on a given intra-refresh rate, which determines the proportion of intra-MBs per frame. The encoding process also includes reconstructing the frames as reference frames for later frames by decoding the encoded frames so that both encoding and decoding will use identical reference frames.

In a conventional video encoding system, the given intra-refresh rate is fixed based on a target refresh period of the system within which the decoded video is expected to reach a good recovery from a random access point. However, a higher intra-refresh rate results in an actual refresh period that is shorter than the target refresh period but requires a higher bit rate. A lower intra-refresh rate requires a lower bit rate but results in a longer actual refresh period, which degrades the user experience. Therefore, it would be beneficial to be able to adaptively adjust the intra-refresh rate during encoding to achieve a refresh period near to the target refresh period.

BRIEF DESCRIPTION OF THE DRAWINGS

The following detailed description of the preferred embodiments of the present invention will be better understood when read in conjunction with the appended drawings. The present invention is illustrated by way of example, and not limited by the accompanying figures, in which like references indicate similar elements.

DETAILED DESCRIPTION

The detailed description of the appended drawings is intended as a description of the currently preferred embodiments of the present invention, and is not intended to represent the only form in which the present invention may be practiced. It is to be understood that the same or equivalent functions may be accomplished by different embodiments that are intended to be encompassed within the spirit and scope of the present invention.

In an embodiment of the present invention, an encoding system for encoding a video source to a media stream that includes a plurality of frames is provided. The encoding system includes an encoder having an encoding unit for encoding the video source to the plurality of frames based on a given intra-refresh rate, wherein each frame includes a plurality of macro blocks (MBs) including a first number of intra-MBs that are decoded based on information in the frame, and a second number of inter-MBs that are decoded based on information in previous frames, wherein the proportion of the first number of intra-MBs of the frame is determined by the given intra-refresh rate, and a decoding unit connected to the encoding unit for providing the information in the previous frames. The encoding system further includes an evaluation unit connected to the encoder for scoring a plurality of MBs of a current frame that is being decoded by the decoding unit, wherein a score of an intra-MB is defined as a predetermined value, and a score of an inter-MB is generated based on scores of MBs of the previous frames, and a controller connected between the encoder and the evaluation unit for identifying a qualified frame based on the scores of the plurality of MBs in at least the current frame, determining an actual refresh period based on the qualified frame, and adjusting the given intra-refresh rate at least based on the actual refresh period.

In another embodiment, the present invention provides a method for encoding a video source to a media stream that includes a plurality of frames, wherein each frame has a plurality of macro blocks (MBs) including a first number of intra-MBs that are decoded based on information in the frame, and a second number of inter MBs that are decoded based on information in previous frames. The method includes encoding the video source to the plurality of frames based on a given intra-refresh rate which determines the proportion of the first number of intra-MBs of the frame, decoding the plurality of frames, generating scores of a plurality of MBs in a current frame that is being decoded, wherein a score of an intra-MB is defined as a predetermined value, and a score of an inter-MB is generated based on scores of MBs of the previously decoded frames, identifying a qualified frame based on the scores of the plurality of MBs of at least the current frame, determining an actual refresh period based on the qualified frame, and adjusting the given-intra refresh rate at least based on the actual refresh period.

Figure 1:
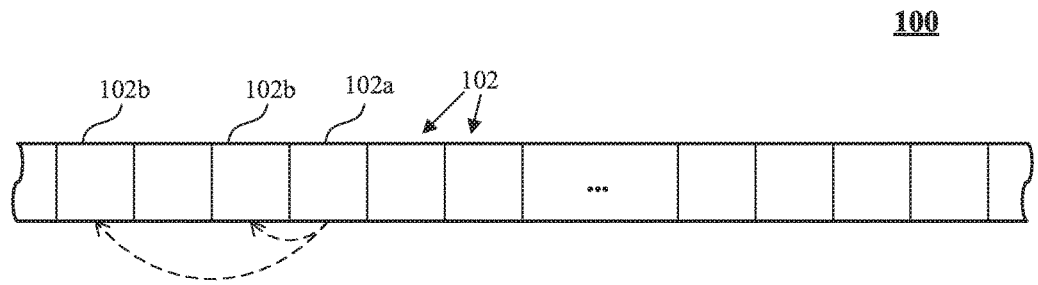
FIG. 1 is a diagram illustrating a bit stream including a plurality of frames.
Figure 2:
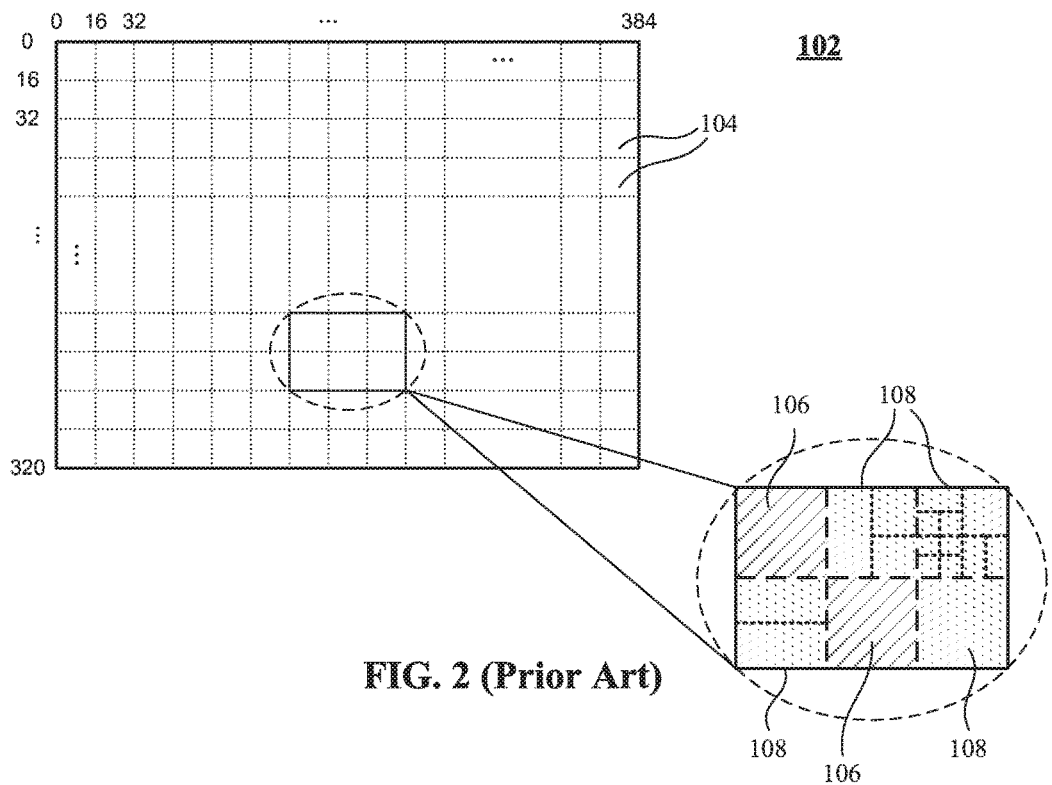
FIG. 2 is a diagram illustrating a frame in the bit stream that is formed by a plurality of macro blocks.
Figure 3:
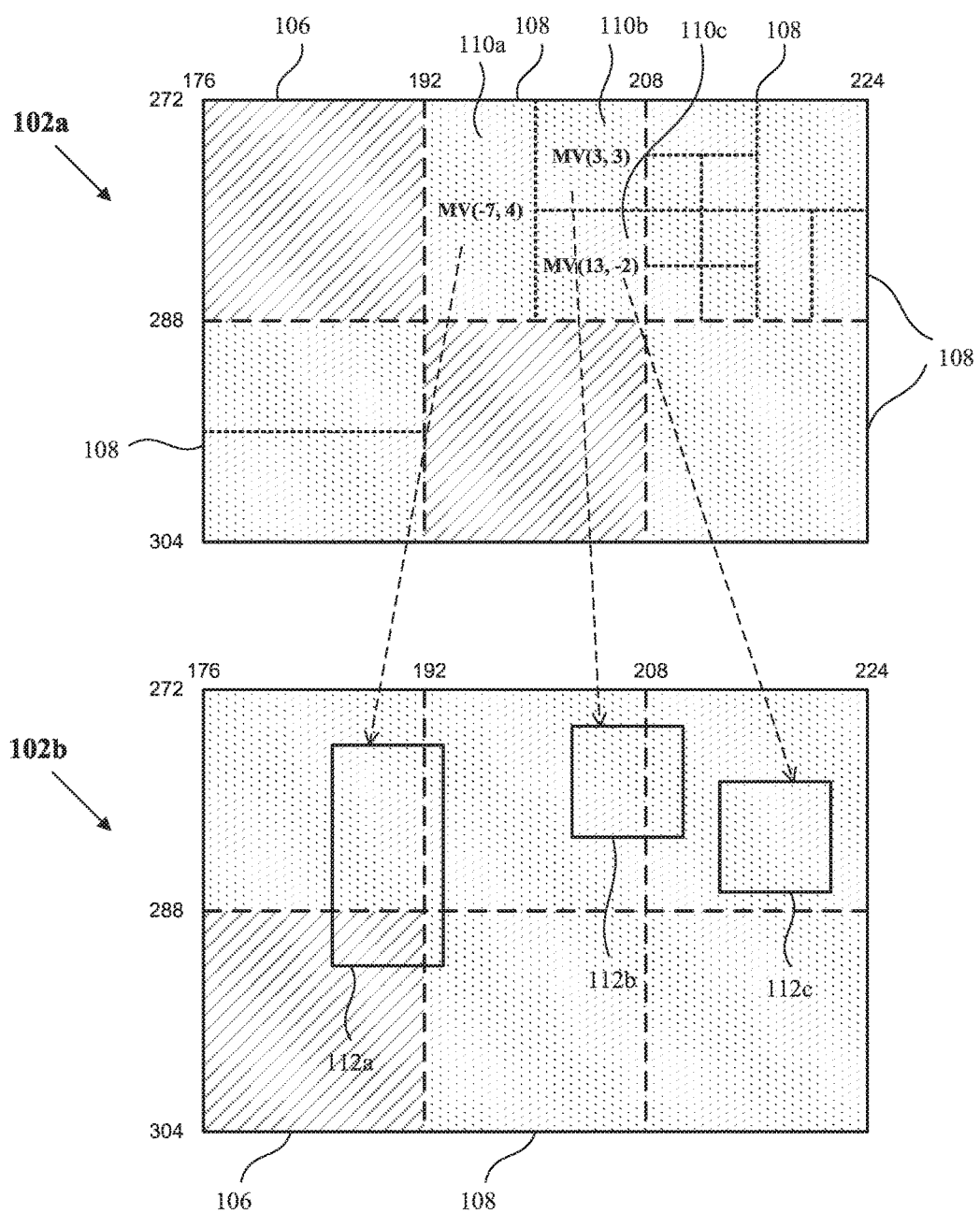
FIG. 3 is a diagram illustrating a mapping between blocks of a macro block in a current frame and corresponding reference blocks in a reference frame.

Referring now to FIG. 3, a mapping between prediction blocks of an inter-MB 108 in a current frame 102a and corresponding reference blocks in a reference frame 102b that has been previously decoded is provided. A frame having a size of 384×320 pixels includes 480 MBs each having a size of 16×16 pixels. In FIG. 3, only part of the MBs in each of the current frame 102a and the reference frame 102b are shown with corresponding coordinates information of the MBs. The MBs includes a plurality of intra-MBs 106 and a plurality of inter-MBs 108. Each inter-MB includes at least one prediction block. For example, as shown in FIG. 3, the inter-MB 108 includes first, second and third prediction blocks 110a, 110b and 110c. The first, second and third prediction blocks are respectively decoded based on first, second and third corresponding reference blocks 112a, 112b and 112c in the corresponding reference frame 102b determined by a motion vector of each of the first, second and third prediction blocks 110a, 110b and 110c. Information of the reference frame and the motion vector of each prediction block is encoded in the prediction block. The first and second reference blocks 112a and 112b are across different MBs of the reference frame 102b, and the third reference block 112c is located within one single MB of the reference frame 102b.

Figure 4:
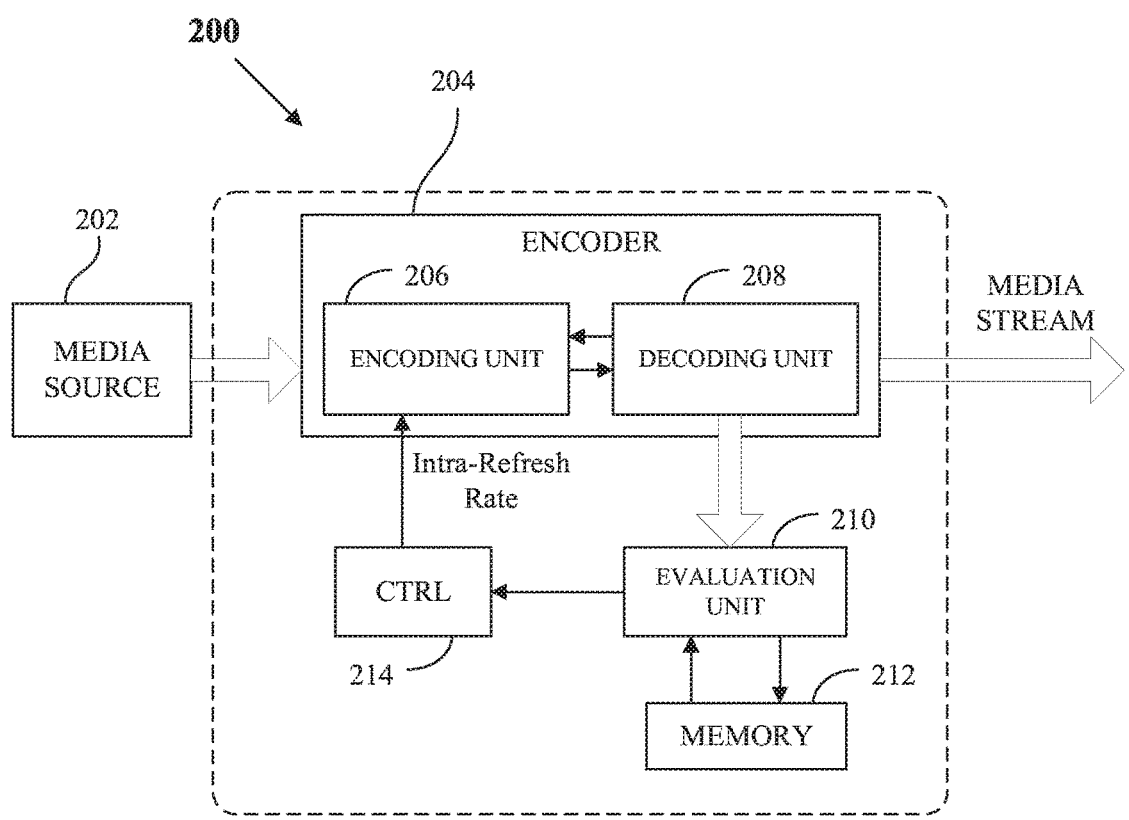
FIG. 4 is a schematic block diagram of a video encoding system in accordance with an embodiment of the present invention.

Referring now to FIG. 4, a schematic block diagram illustrating an encoding system 200 for encoding a video source to a media stream that includes a plurality of frames is shown. Each frame includes a plurality of macro blocks (MBs) including a first number of intra-MBs that are decoded based on information in the frame, and a second number of inter-MBs that are decoded based on information in previous frames. The video source is obtained from a media source 202 which is a data input unit of the encoding system 200, e.g. a camera, or a file of raw video. The encoding system 200 includes an encoder 204 having an encoding unit 206 for encoding the video source to the plurality of frames based on a given intra-refresh rate which determines the proportion of the first number of intra-MBs of the frame, and a decoding unit 208 connected to the encoding unit 206 for providing the information in the previous encoded frames. At beginning of the encoding, the given intra-refresh rate is predetermined based on a target refresh period of the system, wherein the target refresh period is a period, in terms of number of frames, within which the decoded video is expected to reach a good recovery from a random access point. The encoding system 200 further includes an evaluation unit 210 connected to the encoder 204 for scoring a plurality of MBs of a current frame that is being decoded by the decoding unit, wherein a score of an intra-MB is defined as a predetermined value, e.g. 100, and a score of an inter-MB is generated based on scores of MBs of the previous frames, and a memory 212 connected to the evaluation unit 210 for storing the scores of the MBs of the previous frames, wherein the memory 212 can be a RAM, ROM or flash memory.

Figure 5:
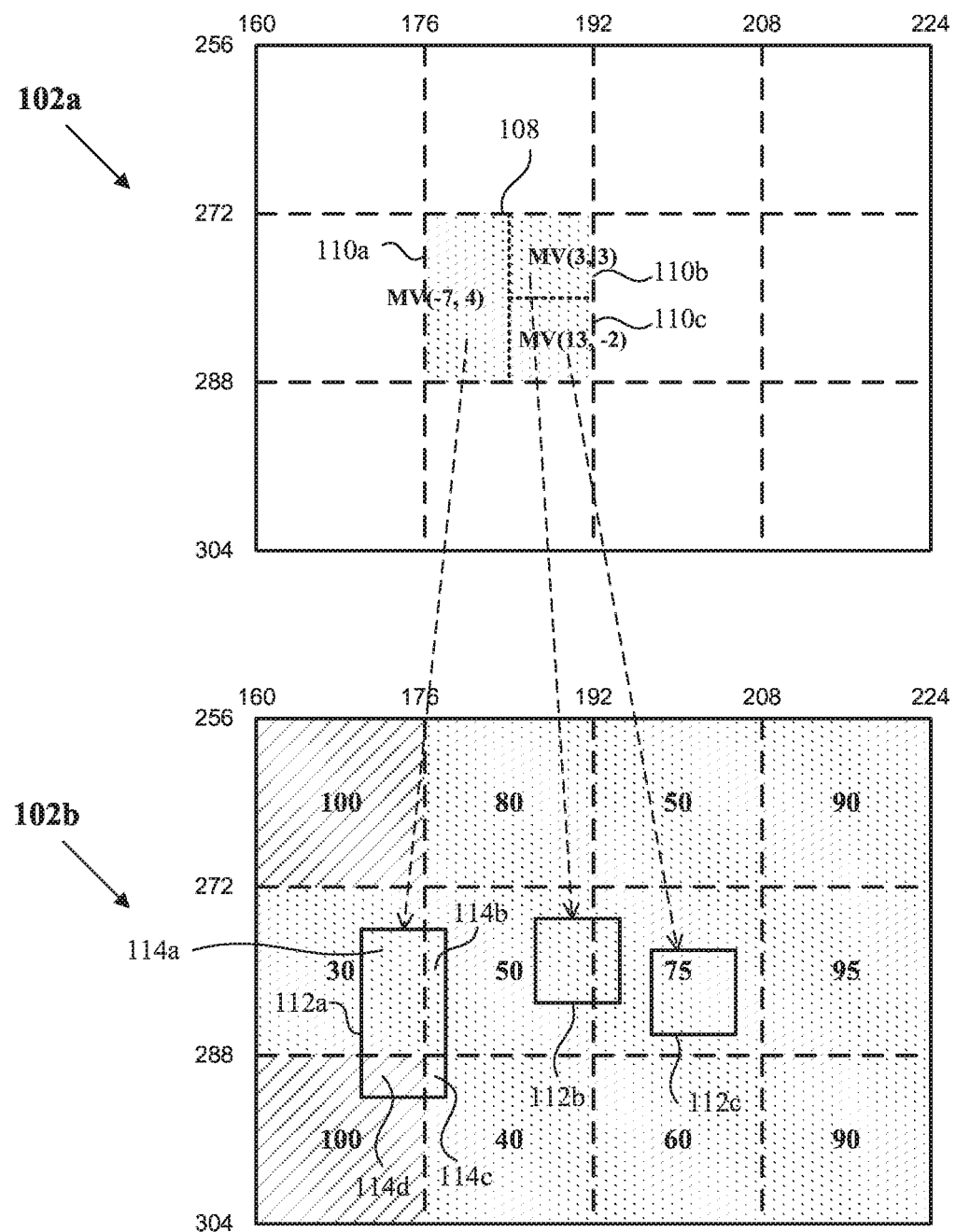
FIG. 5 is a diagram illustrating scoring a macro block based on the mapping between reference blocks of the macro block in the current frame and corresponding areas of the macro block in the reference frame in accordance with an embodiment of the present invention.

FIG. 5 shows a diagram illustrating scoring the inter-MB 108 based on the mapping between the first, second and third prediction blocks 110a, 110b and 110c of the inter-MB 108 in the current frame 102a and the corresponding first, second and third reference blocks 112a, 112b and 112c in the reference frame 102b in accordance with an embodiment of the present invention. The reference frame 102b is one of the previously decoded frames. In FIG. 5, only part of the MBs in each of the current frame 102a and the reference frame 102b are shown with corresponding coordinates information of the MBs. The encoded data in the current frame 102a includes segment of the prediction blocks, motion vectors of the prediction blocks for determining corresponding reference blocks in reference frames 102b, and information of the reference frames of the prediction blocks. For example, the motion vector of the first prediction block 110a of the inter-MB 108 of the current frame 102a is MV (−7, 4). To score the inter-MB 108, the evaluation unit 210 determines the corresponding first, second and third reference blocks 112a, 112b and 112c in the reference frame 102b based on the motion vectors of the first, second and third prediction blocks 110a, 110b and 110c, and respectively breaks down the first, second and third corresponding reference blocks 112a, 112b and 112c into a plurality of portions respectively located within corresponding MBs of the reference frame 102b. For example, the first reference block 112a is broken down into first, second, third and fourth portions 114a, 114b, 114c and 114d that are respectively located within corresponding MBs that are located at (160, 272), (176, 272), (176, 288) and (160, 288) in the reference frame 102b.

The evaluation unit 210 calculates a score of each portion based on the score of the corresponding MB which the portion belongs to, a proportion of an area of the portion and an area of the corresponding MB, and a quality distribution among the corresponding MB and adjacent MBs thereof, sums the scores of the plurality of portions in each prediction block as a score of the prediction block, and generates a score of the inter-MB by summing the scores of the at least one prediction block in the inter-MB.

In a preferred embodiment, the score of each prediction block (PB) is calculated as:

$$Score_{PB} = \sum_{i=1}^{N} k_{1\_i} \cdot \frac{Area_{P\_i}}{Area_{MB\_i}} \cdot Score_{MB\_i},$$

wherein $Area_{P\_i}$ is the area of the $i^{th}$ portion of the prediction block, $Area_{MB\_i}$ is the area of the corresponding MB that the $i^{th}$ portion belongs to, $Score_{MB\_i}$ is the score of the corresponding MB stored in the memory 212, $k_{1\_i}$ is a first weight coefficient of the $i^{th}$ portion determined based on quality distribution among the corresponding MB and adjacent MBs thereof, and N is the number of portions in the prediction block. In a preferred embodiment, in an even quality distribution situation among the corresponding MB and adjacent MBs thereof, $k_{1\_i}=1$, the score of each portion is calculated by multiplying the score of the corresponding MB which the portion belongs to and the proportion of an area of the portion and an area of the corresponding MB. For example, the evaluation unit 208 obtains the score 30 of the MB located at (160, 272) which the first portion 114a belongs to from the memory 212, and calculates a proportion of the area of the first portion 114a and the area of the MB located at (160, 272) based on the motion vector (−7, 4). The area of the first portion 114a is 7×12=84, and the area of the MB located at (160, 272) is 16×16=256, thus the proportion is 84/256, therefore the score of the first portion 114a is 30×84/256=9.84375. The scores of the second, third and fourth portion 114b, 114c and 114d are respectively calculated in a same way shown as in Table 1 below:

TABLE 1

| Portion | Area of the portion | Score of MB | Score of the portion |
|---|---|---|---|
| 1st portion 114a | 84 | 30 | 9.84375 |
| 2nd portion 114b | 12 | 50 | 2.34375 |

TABLE 1-continued

| Portion | Area of the portion | Score of MB | Score of the portion |
|---|---|---|---|
| 3$^{rd}$ portion 114c | 4 | 40 | 0.625 |
| 4$^{th}$ portion 114d | 28 | 100 | 10.9375 |

The evaluation unit 210 sums the scores of the plurality of portions in the first prediction block 110a as the score of the first prediction block 110a. The scores of the second and third prediction blocks 110b and 110c of the inter-MB 108 are respectively calculated in a same way shown as in Table 2 below:

TABLE 2

| Prediction block | Area of the portion |
|---|---|
| 1$^{st}$ prediction block 110a | 23.75 |
| 2$^{nd}$ prediction block 110b | 14.84375 |
| 3$^{rd}$ prediction block 110c | 18.75 |

In a preferred embodiment, the score of each inter-MB of the current frame is calculated as:

$$Score_{MB} = \sum_{i=1}^{M} k_{2\_i} \cdot Score_{PB\_i},$$

wherein $Score_{PB\_i}$ is the score of the $i^{th}$ prediction block of the inter-MB, and $k_{2\_i}$ is a second weight coefficient of the $i^{th}$ prediction block predetermined by the encoding system based on the reference frame that the reference block of the prediction block belongs to, and M is the number of prediction blocks of the inter-MB 108. If the reference blocks of the prediction blocks in the inter-MB belong to more than one reference frame, summing the scores of the prediction blocks in the inter-MB includes weighing the scores of the prediction blocks with the corresponding second weight coefficients $k_{2\_i}$ of the more than one reference frames. If all the prediction blocks of the inter-MB belongs to a same reference frame, the second weight coefficient $k_{2\_i}$ is 1. Therefore, in this example, the score of the inter-MB 108 is 57.34375. The evaluation unit 210 stores the score of the inter-MB 108 in the memory 212.

Referring back to FIG. 4, the encoding system 200 further includes a controller 214 connected between the encoder 204 and the evaluation unit 210 for identifying a qualified frame based on the scores of the plurality of MBs in at least the current frame.

Figure 6:
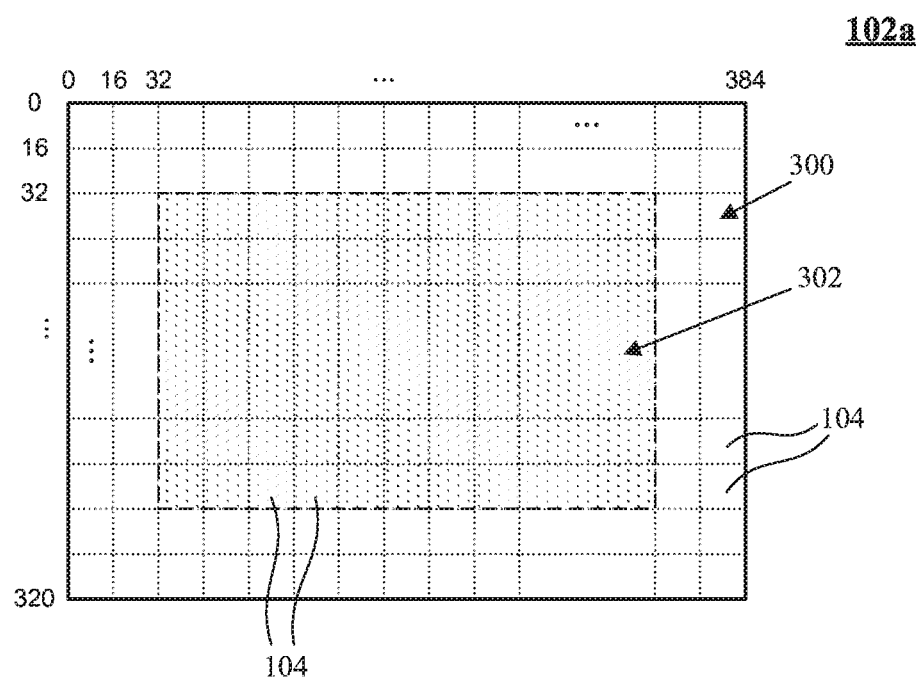
FIG. 6 is a diagram illustrating a current frame that has a first region and a second region that is predetermined as a region of interest.

In a preferred embodiment, the current frame 102a is identified as the qualified frame if MBs that have scores below a pre-determined threshold are out of a predetermined region of the current frame 102a. FIG. 6 shows an example illustrating the current frame 102a that has a first region 300 adjacent to at least one side of the current frame 102a, and a second region 302 which is predetermined as a region of interest based on user's preference. The current frame 102a is identified as the qualified frame if MBs that have scores below a predetermined threshold are out of the second region 302 of the current frame 102a.

In another preferred embodiment, the current frame 102a is identified as the qualified frame if a distance between a position of a first MB that has the lowest score among the MBs in the current frame and a position of a second MB that has the lowest score among the MBs in a last frame is greater than a predetermined distance.

In yet another preferred embodiment, the qualified frame is identified based on a frame score of at least one of the current frame 102a and the previously decoded frames. The frame score of each frame is determined based on scores of the MBs in the frame. In a preferred embodiment, the frame score of the each frame is determined as a weighted sum of scores of the MBs in the frame, wherein a weight coefficient of each MB is predetermined based on region of interest, and stored in the memory. In another preferred embodiment, the frame score of the each frame is determined as the lowest score of the scores of the MBs in the frame. In a preferred embodiment, the current frame 102a is identified as the qualified frame if the frame score of the current frame 102a is no less than a first predetermined threshold. In another preferred embodiment, either one of the current frame and a last frame is identified as the qualified frame if difference of the frame scores of the current frame and the last frame is less than a second predetermined threshold. In yet another preferred embodiment, one of the current frame 102a and last two frames is identified as the qualified frame if difference between difference of the frame scores of the current frame and the last frame, and difference of the frame scores of the last and second last frames is less than a third predetermined threshold.

In a preferred embodiment, the controller 214 resets the scores of corresponding MBs to 0 after a qualified frame.

The controller 214 further determines an actual refresh period based on the qualified frame, and adjusts the given intra-refresh rate at least based on the actual refresh period. In a preferred embodiment, the actual refresh period is determined as the period, in terms of number of frames, between the qualified frame and last qualified frame. If the actual refresh period is greater than the target refresh period, the controller 214 increases the intra-refresh rate provided to the encoding unit 206, and if the actual refresh period is less than the target refresh period, the controller 214 decreases the intra-refresh rate provided to the encoding unit 206, such that the intra-refresh rate is adaptively adjusted to make the actual refresh period approximate the target refresh period. In a preferred embodiment, the increasing and decreasing ranges of the intra-refresh rate is determined based on the actual refresh period, target refresh period and the current intra-refresh rate. For example, the new intra-refresh rate is determined as:

$$Rate_{new} = \frac{\text{Actual refresh period}}{\text{Target refresh period}} \cdot Rate_{current},$$

wherein $Rate_{new}$ is the new intra-refresh rate, and $Rate_{current}$ is the current intra-refresh rate. In another preferred embodiment, the increasing and decreasing ranges of the intra-refresh rate is a predetermined value configured by the encoding system 200, such as 1%, 2% or 5% of the current intra-refresh rate. The encoder 204, the evaluation unit 210 and the controller 212 can be a part of a processor, such as a CPU, a MCU or a DPU.

Figure 7:
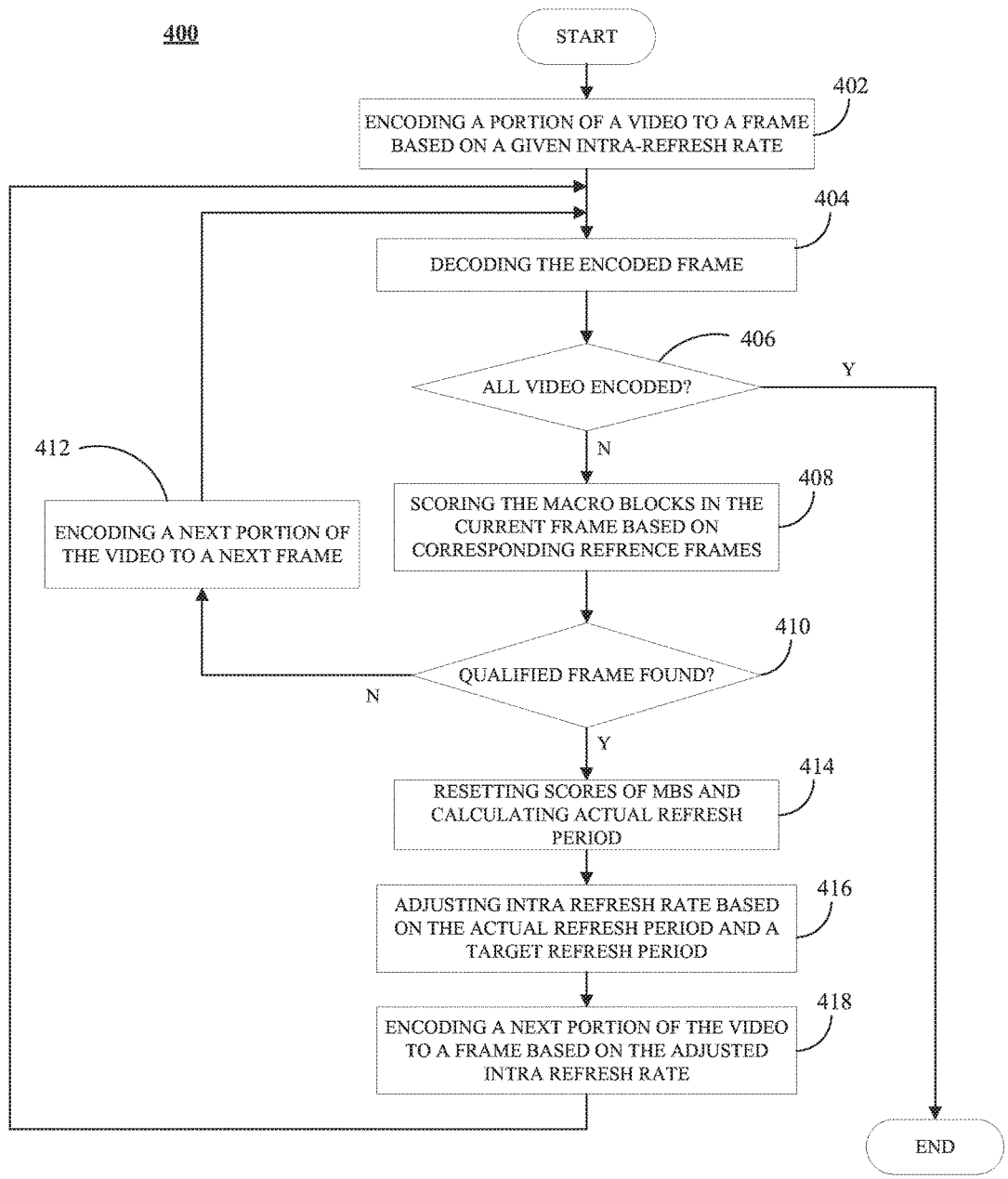
FIG. 7 is a flow chart of a method for encoding video source data to a media stream with a video encoding system in accordance with an embodiment of the present invention.

Referring now to FIG. 7, a flow chart depicting a method 400 for encoding a video source to a media stream in accordance with an embodiment of the present invention is shown. Steps in the flowchart of FIG. 8 have been explained in conjunction with FIGS. 4~6.

Starting at step 402, the encoding unit 206 of the encoder 204 encodes a portion of a video obtained from the media source 202 to a current frame based on a given intra-refresh rate. The current frame includes a plurality of macro blocks including a first number of intra-MBs that are decoded based on information in the current frame, and a second number of inter-MBs that are decoded based on information in previous frames, wherein the proportion of the number of intra-MBs of the current frame is determined by the given intra-refresh rate, wherein at beginning of the encoding, the given intra-refresh rate is predetermined based on a target refresh period of the system, wherein the target refresh period is a period, in terms of number of frames, within which the decoded video is expected to reach a good recovery from a random access point.

At step 404, the decoding unit 208 decodes the current frame. The reconstructed frames are stored in a frame buffer of the encoding system 200, and are overwritten by later reconstructed frames once the reconstructed frames are no longer used.

At step 406, if all the video has been encoded, the encoding system 200 exits the encoding process. Otherwise, at step 408, the evaluation unit 210 scores the plurality of MBs of the current frame that is being decoded, wherein a score of an intra-MB is defined as a predetermined value, e.g. 100, and a score of an inter-MB is generated based on scores of MBs in reference frames that have been previously decoded, and stored in the memory 212, wherein the memory can be a RAM, ROM or flash memory.

Figure 8:
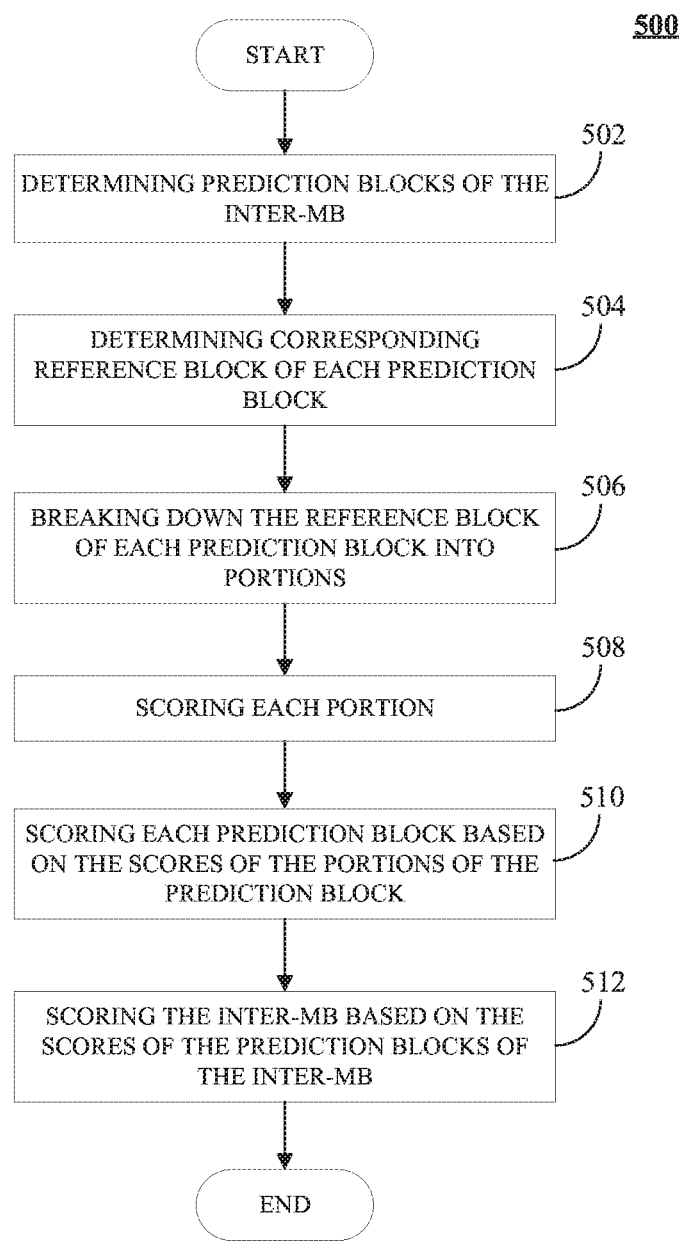
FIG. 8 is a flow chart of a method for scoring an inter-MB of the current frame in accordance with an embodiment of the present invention.

FIG. 8 is a flow chart depicting a method 500 of scoring an inter-MB of the current frame in accordance with an embodiment of the present invention.

At step 502, the decoding unit 208 determines prediction blocks of the inter-MB based on data of the inter-MB. Each inter-MB includes at least one prediction block.

At step 504, the evaluation unit 210 determines a corresponding reference block of each prediction block in a corresponding reference frame based on a motion vector of the prediction block.

At step 506, the evaluation unit 210 breaks down the reference block of each prediction block into a plurality of portions that respectively are located within corresponding MBs of the corresponding reference frame.

At step 508, the evaluation unit 210 calculates a score of each portion based on the score of the corresponding MB, a proportion of an area of the portion and an area of the corresponding MB, and a quality distribution among the corresponding MB and adjacent MBs thereof, and at step 510, the evaluation unit 210 scores each prediction block based on the scores of the portions of the prediction block.

In a preferred embodiment, the score of each prediction block (PB) is calculated as:

$$Score_{PB} = \sum_{i=1}^{N} k_{1\_i} \cdot \frac{Area_{P\_i}}{Area_{MB\_i}} \cdot Score_{MB\_i},$$

wherein $Area_{P\_i}$ is the area of the $i^{th}$ portion of the prediction block, $Area_{MB\_i}$ is the area of the corresponding MB that the $i^{th}$ portion belongs to, $Score_{MB\_i}$ is the score of the corresponding MB stored in the memory 212, $k_{1\_i}$ is a first weight coefficient of the $i^{th}$ portion determined based on quality distribution among the corresponding MB and adjacent MBs thereof, and N is the number of portions in the prediction block. At step 512, the evaluation unit 210 generates a score of the inter-MB based on the scores of the prediction blocks of the inter-MB.

In a preferred embodiment, the score of each inter-MB of the current frame is calculated as:

$$Score_{MB} = \sum_{i=1}^{M} k_{2\_i} \cdot Score_{PB\_i},$$

wherein $Score_{PB\_i}$ is the score of the $i^{th}$ prediction block of the inter-MB, and $k_{2\_i}$ is a second weight coefficient of the $i^{th}$ prediction block predetermined by the encoding system based on the reference frame that the reference block of the prediction block belongs to, and M is the number of prediction blocks of the inter-MB 108. If the reference blocks of the prediction blocks in the inter-MB belong to more than one reference frame, summing the scores of the prediction blocks in the inter-MB includes weighing the scores of the prediction blocks with the corresponding second weight coefficients $k_{2\_i}$ of the more than one reference frames. If all the prediction blocks of the inter-MB belongs to a same reference frame, the second weight coefficient $k_{2\_i}$ is 1. The evaluation unit 210 further stores the score of the inter-MB in the memory 212.

Referring back to FIG. 7, at step 410, the controller 212 identifies a qualified frame from the frames that have been decoded using the scores of the MBs of the decoded frames.

In a preferred embodiment, a frame is identified as the qualified frame if MBs that have scores below a predetermined threshold are out of a predetermined region of the frame.

In another preferred embodiment, a frame is identified as the qualified frame if a distance between a position of a first MB that has the lowest score among the MBs in the current frame and a position of a second MB that has the lowest score among the MBs in a last frame is greater than a predetermined distance.

In yet another preferred embodiment, the qualified frame is identified based on a frame score of at least one of the current frame and the previously decoded frames. The frame score of each frame is determined based on scores of the MBs in the frame. In a preferred embodiment, the frame score of the each frame is determined as a weighted sum of scores of the MBs in the frame, wherein a weight coefficient of each MB is predetermined based on region of interest, and stored in the memory. In another preferred embodiment, the frame score of the each frame is determined as the lowest score of the scores of the MBs in the frame. In a preferred embodiment, the current frame is identified as the qualified frame if the frame score of the current frame is no less than a first predetermined threshold. In another preferred embodiment, either one of the current frame and a last frame is identified as the qualified frame if difference of the frame scores of the current frame and the last frame is less than a second predetermined threshold. In yet another preferred embodiment, one of the current frame and last two frames is identified as the qualified frame if difference between difference of the frame scores of the current frame and the last frame, and difference of the frame scores of the last and second last frames is less than a third predetermined threshold.

At step 412, if a qualified frame is not identified, the encoding unit 206 continues to encode a next portion of the video to a next frame.

At step 414, if a qualified frame is identified, the controller 214 resets the scores of corresponding MBs to 0 and calculates an actual refresh period based on the qualified frame. In a preferred embodiment, the actual refresh period is determined as the period between the qualified frame and last qualified frame.

At step 416, the controller 214 further adjusts the given intra-refresh rate at least based on the actual refresh period. In a preferred embodiment, if the actual refresh period is greater than the target refresh period, the controller 214 increases the intra-refresh rate provided to the encoding unit 206, and if the actual refresh period is less than the target refresh period, the controller 214 decreases the intra-refresh rate provided to the encoding unit 206. In a preferred embodiment, the increasing and decreasing ranges of the intra-refresh rate is determined based on the actual refresh period, target refresh period and the current intra-refresh rate. For example, the new intra-refresh rate is determined as:

$$Rate_{new} = \frac{\text{Actual refresh period}}{\text{Target refresh period}} \cdot Rate_{current},$$

wherein $Rate_{new}$ is the new intra-refresh rate, and $Rate_{current}$ is the current intra-refresh rate. In another preferred embodiment, the increasing and decreasing ranges of the intra-refresh rate is a predetermined value configured by the encoding system 200, such as 1%, 2% or 5% of the current intra-refresh rate.

At step 418, the encoding unit 206 continues to encode a next portion of the video to a next frame based on the adjusted intra-refresh rate, such that the intra-refresh rate is adaptively adjusted to make the actual refresh period approximate the target refresh period.

While various embodiments of the present invention have been illustrated and described, it will be clear that the present invention is not limited to these embodiments only. Numerous modifications, changes, variations, substitutions, and equivalents will be apparent to those skilled in the art, without departing from the spirit and scope of the present invention, as described in the claims.

The invention claimed is:

1. An encoding system for encoding a video source to a media stream that includes a plurality of frames, comprising:
an encoder that includes:
an encoding unit for converting the video source to the plurality of frames based on a given intra-refresh rate, wherein each frame comprises a plurality of macro blocks (MBs) including a first number of intra-MBs that are decoded based on information in the frame, and a second number of inter-MBs that are decoded based on information in previous frames, wherein the proportion of the first number of intra-MBs of the frame is determined by the given intra-refresh rate, and
a decoding unit connected to the encoding unit for providing the information in the previous frames;
an evaluation unit connected to the encoder for scoring a plurality of the MBs of a current frame that is being decoded by the decoding unit, wherein a score of an intra-MB is defined as a predetermined value, and a score of an inter-MB is generated based on scores of MBs of the previous frames; and
a controller connected between the encoder and the evaluation unit for identifying a qualified frame based on the scores of the plurality of MBs in at least the current frame, determining an actual refresh period based on the qualified frame, and adjusting the given intra-refresh rate at least based on the actual refresh period.

2. The encoding system of claim 1, wherein at the beginning of said encoding, the given intra-refresh rate is an initial intra-refresh rate based on a target refresh period.

3. The encoding system of claim 1, wherein each inter-MB comprises at least one prediction block, wherein each prediction block is decoded based on a corresponding reference block in a corresponding reference frame determined by a motion vector of the prediction block, wherein scoring an inter-MB comprises:
identifying the corresponding reference block of each prediction block of the inter-MB in a corresponding reference frame based on the motion vector;
breaking down the corresponding reference block of each prediction block into a plurality of portions respectively located within corresponding MBs of the reference frame;
calculating a score of each portion based on the score of the corresponding MB, a proportion of an area of the portion and an area of the corresponding MB, and quality distribution among the corresponding MB and MBs adjacent thereto;
generating a score for each prediction block based on the scores of the plurality of portions of each prediction block; and
generating the score of the inter-MB by summing the scores of the at least one prediction block of the inter-MB.

4. The encoding system of claim 3, wherein if the reference blocks of the prediction blocks in the inter-MB belong to more than one reference frame, said summing the scores of the prediction blocks of the inter-MB comprises weighting the scores of the prediction blocks with corresponding weight coefficients of the more than one reference frames.

5. The encoding system of claim 1, wherein the current frame is identified as the qualified frame if MBs that have scores below a predetermined threshold are out of a predetermined region of the current frame, or a distance between a position of a first MB that has the lowest score among the MBs in the current frame and a position of a second MB that has the lowest score among the MBs in a last frame is greater than a predetermined distance.

6. The encoding system of claim 1, further comprising a memory coupled to the evaluation unit for storing the scores of the MBs of the previously decoded frames.

7. The encoding system of claim 6, wherein the qualified frame is identified based on a frame score of at least one of the current frame and the previously decoded frames, wherein the frame score of each frame is determined based on scores of the MBs in the frame.

8. The encoding system of claim 7, wherein the frame score of each frame is determined as a weighted sum of scores of the MBs in the frame, wherein a weight coefficient of each MB is based on a region of interest, and stored in the memory.

9. The encoding system of claim 7, wherein the current frame is identified as the qualified frame if the frame score of the current frame is greater than a predetermined threshold.

10. The encoding system of claim 7, wherein one of the current frame and a last frame is identified as the qualified frame if a difference of the frame scores of the current frame and the last frame is less than a predetermined threshold.

11. The encoding system of claim 7, wherein one of the current frame and the last two frames is identified as the qualified frame if a difference between a difference of the frame scores of the current frame and the last frame, and a difference of the frame scores of the last and the second to last frame is less than a predetermined threshold.

12. A method for encoding a video source to a media stream that includes a plurality of frames, comprising:
    encoding the video source to the plurality of frames based on a given intra-refresh rate, wherein each frame comprises a plurality of macro blocks (MBs) including a first number of intra-MBs that are decoded based on information in the frame, and a second number of inter MBs that are decoded based on information in previous frames, wherein the proportion of the first number of intra-MBs of the frame is determined by the given intra-refresh rate;
    decoding the plurality of frames;
    calculating scores of a plurality of the MBs in a current frame that is being decoded, wherein a score of an intra-MB is defined as a predetermined value, and a score of an inter-MB is determined based on scores of MBs of the previously decoded frames;
    identifying a qualified frame based on the scores of the plurality of MBs of at least the current frame;
    determining an actual refresh period based on the qualified frame; and
    adjusting the given-intra refresh rate at least based on the actual refresh period.

13. The method of claim 12, wherein at a beginning of said encoding, the given intra-refresh rate is an initial intra-refresh rate based on a target refresh period.

14. The method of claim 12, wherein each MB comprises at least one prediction block, wherein each prediction block is decoded based on a corresponding reference block in a corresponding reference frame determined by a motion vector of the prediction block, and wherein calculating the score of an inter-MB in the current frame comprises:
    identifying the corresponding reference block of each prediction block of the inter-MB based on the motion vector in a corresponding reference frame,
    breaking down the corresponding reference block of each prediction block into a plurality of portions that are respectively located within corresponding MBs of the corresponding reference frame,
    calculating a score of each portion based on the score of the corresponding MB, a proportion of an area of the portion and an area of the corresponding MB, and a quality distribution among the corresponding MB and MBs adjacent thereto,
    calculating a score of each prediction block based on scores of the plurality of portions of the prediction block, and
    calculating a score of the inter-MB by summing the scores of the at least one prediction block in the inter-MB.

15. The method of claim 14, wherein if the reference blocks of the prediction blocks in the inter-MB belong to more than one reference frame, then said summing the scores of the prediction blocks in the inter-MB comprises weighting the scores of the prediction blocks with corresponding weight coefficients of the reference frames.

16. The method of claim 12, wherein the current frame is identified as the qualified frame if MBs that have scores below a predetermined threshold are out of a predetermined region of the current frame, or a distance between a position of a first MB that has the lowest score among the MBs in the current frame and a position of a second MB that has the lowest score among the MBs in a last frame is greater than a predetermined distance.

17. The method of claim 12, wherein the qualified frame is identified based on a frame score of at least one of the current frame and the previously decoded frames, wherein the frame score of each frame is determined based on the scores of the MBs in the frame.

18. The method of claim 17, wherein the frame score of each frame is determined as one of (i) a weighted sum of scores of the MBs in the frame, wherein a weight coefficient of each MB is based on a region of interest, and (ii) the lowest score of the scores of the MBs in the frame.

19. The method of claim 17, wherein the current frame is identified as the qualified frame if the frame score of the current frame is not less than a predetermined threshold.

20. The method of claim 17, wherein the qualified frame is identified based on a variation range among scores of the current frame and a number of previous frames, and a predetermined threshold.

* * * * *